June 21, 1955  W. F. CARR  2,711,450
CAM-OPERATED ELECTRICAL SWITCH
Filed March 20, 1952

INVENTOR.
William F. Carr
BY
Attorney

United States Patent Office 2,711,450
Patented June 21, 1955

2,711,450

CAM-OPERATED ELECTRICAL SWITCH

William F. Carr, Grand Rapids, Mich., assignor to Lear, Incorporated, Grand Rapids, Mich.

Application March 20, 1952, Serial No. 277,665

8 Claims. (Cl. 200—18)

This invention relates to a switch mechanism. More particularly it has relation to a switch of the rotary cam-operated type, and wherein the switch may be actuated at a predetermined angular position of the rotary member with an accuracy of plus or minus 1/2° or better.

In many devices it is necessary to interrupt current to a driving motor when a shaft, usually driven by that same motor, has rotated to some predetermined angular position, and in most cases it is convenient to affix a cam to the shaft and to arrange the same to open and/or close a pair of switch contacts. In some cases a single shaft may carry a plurality of cams to actuate a plurality of switches individual thereto, each of which latter may be required to be operated at various angular positions of the shaft. For example, in an actuator for moving aircraft components, e. g. wing flaps, to a precise position of retraction or extension the motor may drive a jackscrew which acts linearly to move the flaps. Extension of the flaps to a maximum allowable position may be limited in accordance with the rotation of a shaft turning in unison with the jackscrew, so that a specified linear movement of the jackscrew would correspond both to a definite position of the flap and of a shaft upon which a cam is carried. Such cam in turn may be made to operate a switch which interrupts current to the motor when the maximum flap position has been attained and regardless of some other circuit component acting to control the motor. Requirements in this connection may be extremely rigid, i. e. the cam may be called upon to cause switch action from "on" to "off" or vice versa with an accuracy of say plus or minus 1/2° of shaft rotation, for the reason that any wider tolerance may allow the flaps to occupy an aerodynamically hazardous position. The same rigid specification may govern the retracted position of the flaps to true streamlining with the wings. In the case of present day high speed aircraft of the jet engine type accuracy in positioning of various components is of even greater significance, inasmuch as errors of mispositioning of aerodynamically-influenced surfaces are frequently magnified in exponential ratio to the air speed.

This invention has for its principal object to provide a rotary cam-operated switch mechanism which is characterized by extreme accuracy of operation.

Another object lies in providing a switch mechanism of the character aforesaid which may include a plurality of switches each having an individual cam, and the latter being so arranged on a common shaft that a selected cam may be angularly adjusted in a coarse sense without disturbing any pre-set adjusted position of other cams on the same shaft.

A further object is to provide a switch mechanism in accordance with the foregoing paragraph, the cams of which may be independently adjusted without the use of tools.

Still another object is to provide a switch mechanism of the character aforesaid over-center snap-action switches having an inherent minute operating differential and mounted on novel adjustable means whereby a micrometric adjustment of the operating point may be achieved.

An additional object lies in providing means for adjustably supporting a switch unit of a common type which is self-contained in a plastic composition casing, and without the necessity of drilling into or otherwise fastening parts thereto, and without depending upon the casing to absorb any undue stress.

Other objects will become apparent from the following description which, taken together with the accompanying drawing, sets forth a preferred mode of carrying the invention into practice.

Figure 1:
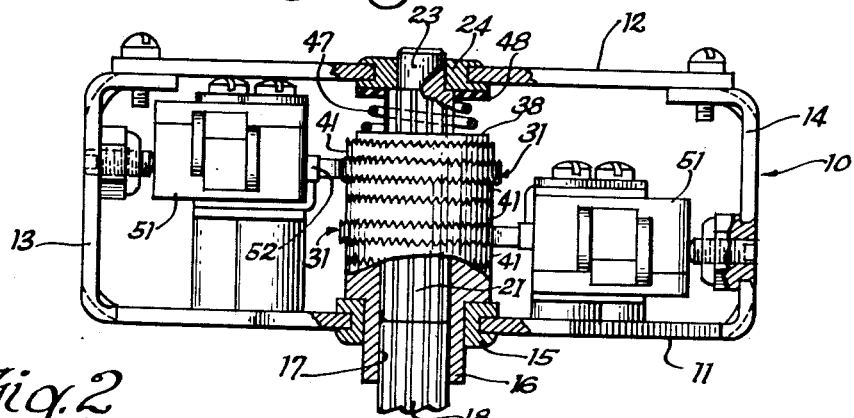
Fig. 1 is a front elevational view, partly in cross section, showing a switch mechanism embodying the invention.
Figure 2:
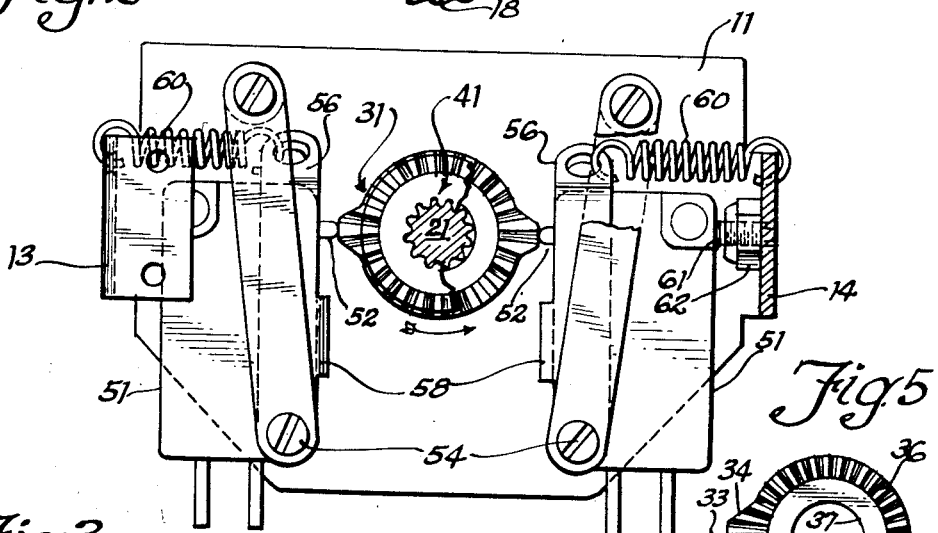
Fig. 2 shows a top plan view thereof.

In what follows the invention will be described in connection with a mechanism including two switches of the single pole-single throw type, i. e. "off" to "on" and vice versa, although only one switch or a plurality greater than two may be equally well employed. It will be understood, from the ensuing description, that the nature of the poles or operation of the switch are not of particular consequence, except to state that an operating element therefor is arranged to be moved by a cam having the construction and function to be detailed. Moreover, even though switches of the over-center, snap-action type are shown by way of example it is to be understood that the invention is not intended to be limited to that particular type.

Broadly regarded the invention, in one aspect, contemplates the provision of a spindle arranged to be rotated in some timed relationship with other components whose movement is to be governed, at least in part, by a switch operated in accordance with a definite angular position of the spindle. A disc-like cam is fitted over the shaft, and except for restraining means to be hereinafter outlined, is capable of being freely rotarily adjusted on the spindle. Splined, or otherwise arranged for axial movement but not relative rotary movement, with respect to the spindle are one or more disc-like elements, at least one thereof being positioned adjacent the cam. Such juxtaposed faces are provided with radially-disposed serrations which are interengaged in order that rotation of the spindle is effective, through the disc-like element to rotate the cam. A compression spring is positioned on the spindle, and is adapted to bear against the cam or the spacer to maintain the same in interlocking engagement, and yet manually deformed to permit ready separation thereof for angular adjustment of the cam to a selected position and its subsequent retention, upon restoration of spring force, in such new position. In another aspect the invention contemplates the provision of a switch having an element bearing on the cam for operation of the switch, and so supported for adjustment that the operating point of the cam with respect to the element may be micrometrically adjusted. Thus by means of the comparatively coarse adjustment realizable from the serrations complemented by the fine adjustment of which the switch is capable, a device is provided which may be easily adjusted to a high degree of accuracy.

Referring now to the drawing there is shown a rectangular frame 10 including a bottom member 11, a top member 12 and side members 13 and 14. Supported for rotation in a bearing 15 fastened to the member 11 is a coupling 16 having a splined opening 17 therein. A correspondingly splined shaft 18 is fitted thereinto and is driven by an electric motor and suitable gear reduction unit (not shown). Also received in the opening 17 is a splined spindle or shaft 21 terminating in a cylindrical portion 23 rotatably carried in another bearing 24 secured in the upper frame member 12.

Figure 5:
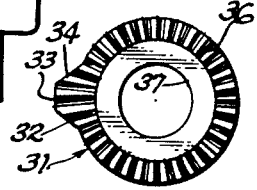
Fig. 5 shows a plan view of one of the cams.
Figure 3:
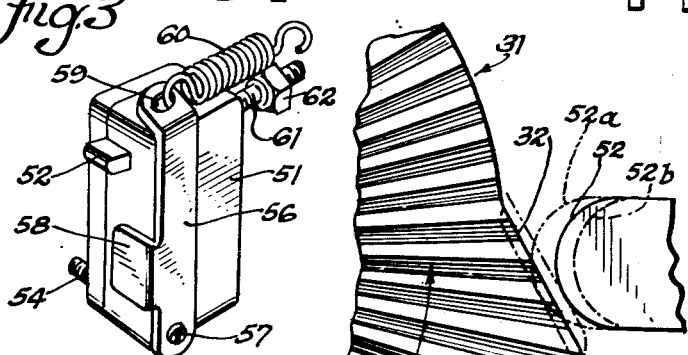
Fig. 3 is a perspective detail of one of the switches proper and its adjustable support.
Figure 6:
Fig. 6 shows a plan view of one of the cam spacers.

Turning now to Figs. 5 and 6 particularly, there is provided for each switch to be described a disc-like cam 31, preferably of rigid plastic composition for lightness and ease of manufacture, including a rise 32, a dwell 33, and a fall 34, rotation being assumed as anti-clockwise. At least a peripheral portion of the cam is provided on both its faces with radially disposed serrations 36, in this case seventy-two in number, although obviously not so limited. The central aperture 37 of the cam is simply circular, and is adapted to fit snugly, but not with a press fit, over the spindle 21. Additionally by utilizing a plastic composition for the cams different colors may be readily availed of for each of a plurality of cams in close adjacency, and thus a particular cam may, if desired, be "color-coded" to its function in the circuit.

Interposed between the coupling 16 and a washer 38, and also between the successive cams 31 is a plurality of annular spacers 41, each provided on both faces with peripherally disposed radial serrations 42 of the same depth and angular spacing as the serrations 36 and adapted to mate therewith. However, each spacer 41 is provided with a splined aperture 43 adapted to engage over the splines of the spindle 21, and therefore to be driven thereby.

From Fig. 1 it will be noted that a spacer 41 is disposed on each side of a cam 31, although in the case of spacers intermediate a pair of cams the additional one or ones may simply be used to space the cams a predetermined axial distance apart. Since the serrations of the cams and spacers are interlocked rotation of the spindle is effective also to rotate the cams. By careful fitting of the splined connection between the spacers and spindle backlash in the cams may, for all practical purposes, be eliminated.

In order to maintain the cams and spacers in operative engagement a compression spring 47 is interposed between the washer 38 and a thrust washer 48 of fiber or other suitable material. Preferably washer 48 is also engaged in a splined manner with the spindle 21. Accordingly to adjust one of the cams 31 in an angular sense it is necessary only to grasp that cam and to move the same sufficiently axially as to disengage its serrations from the confining spacers, whereupon it may be rotated to the new position and released. The spring 47 is consequently again effective to maintain the newly selected location of the cam. It will be apparent that only the cam then undergoing adjustment need be disturbed, the other cam or cams remaining securely positioned with respect to their associated spacers which, in turn, are keyed to the spindle. To facilitate accomplishment of this objective the principal exterior diameter of the cams is slightly larger than the exterior diameter of the spacers, and as shown. It will be clear that the seventy-two serrations of the example will permit angular adjustment in 5° increments which, for convenience, is referred to herein as "coarse" adjustment.

By way of example the switches 51—51 are shown as so-called "Micro" switches, i. e. of the over-center, snap-action type, and comprise a substantially parallelepipedic casing from which an actuating button 52 protrudes, and which latter is in line with a cam 31 for actuation thereby. Such switches are usually provided by the manufacturer with an aperture for receiving a securing screw and which, in the case of the present invention, is utilized to fit over a shaft 54, e. g. a shoulder screw threaded into the frame member 11, and whereby the switch may be tiltably adjusted in a manner to be explained. A combined support and adjusting lever 56 is incorporated with each switch, and includes an aperture 57 engaged over the pivot 54, an ear 58 disposed against the inwardly-disposed wall of the switch casing, and a spring-receiving hole 59. A tension spring 60 extends between the lever 56 and the frame members 13 and 14 respectively to bias the levers and their associated switches constantly outwardly. In this connection it will be observed that by reason of the lug 58 abutting the wall of the casing it is unnecessary to bore holes into the switch casing or otherwise to mutilate the same in order to secure some form of adjustment lever thereto. It will be comprehended that commercially available "Micro" switches are extremely sensitive, hence carefully manufactured; and are sold sealed against tampering. Except for the minute clearance allowed around the actuating button 52, the switches are dust-proof. Obviously, not only will a screw or other fastening be found unreliable when threaded into the plastic switch casing, but there is the hazard of running the drill into the interior of the switch with possible damage to the parts, as well as interference with operation due to drilled-out scrap falling within. Therefore it is important that switches of this character be utilized in a manner such that no machining operations need be performed thereon, and such that no reliance be placed on supports or actuating members secured to the thin wall thereof.

In order to alter the operating relationship of the button 52 with respect to its individual cam 31 a set screw 61 is provided, and is received in a threaded bushing or nut 62 preferably having a core of fiber or other material of substantial coefficient of friction in order to maintain an adjusted position of the screw. Obviously other common expedients may be employed to lock the screw in an adjusted position. Thus, upon turning the screw in or out the switch 51 may be rocked on its pivot 57, inward movement of the screw causing shifting of the button 52 to a position, say 52a (Fig. 4), and outward movement, through tension of the spring 60, causing shifting of the button 52 to a position, say 52b (Fig. 4).

Figure 4:
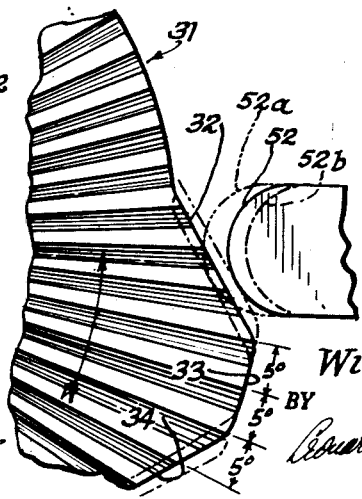
Fig. 4 is a somewhat enlarged fragmentary view to show the nature of the micrometric operation of the mechanism.

Referring to Fig. 4 the button 52 is shown in its relation to the rise 32 of the cam 31, it being understood that its function with respect to the fall 34 will be similar but reversed. Furthermore it will be comprehended that a "Micro" switch is characterized by an operating differential, i. e. the actauting button must be allowed some small movement for dislodging the over-center spring between its two positions. Taking into consideration this differential, as well as the "dead zone" of the switch, (which is the amount the button may move without causing switch actaution from "off" to "on" or vice versa) it is possible to adjust the relation between the button 52 and the cam 31 so as to trip the switch with an accuracy greater than the 5° incremental adjustments realizable by angular adjustment of the cam with respect to its spindle, and as heretofore explained.

For example, in Fig. 4, it will be noted that the point at which the rise 32 contacts the button 52 may be shifted radially inwardly or outwardly by moving the switch. Accordingly the actual tripping point may be adjusted with an accuracy far less than the 5° coarse adjustment. In fact, it has been found in practice that the point of operation may be adjusted to within plus or minus 1/2° of a selected angle and, under some circumstances, even finer. Obviously a similar range of micrometric adjustment is possible if actuation on the "fall" portion 34 of the cam is desired, and the switch is of a character capable of actuation on both "rise" and "fall."

From the foregoing it will have become apparent that I have provided a cam-operated switch mechanism of the rotary type which is capable of micrometric angular setting of the operating point, and of maintaining the setting notwithstanding severe vibration such as is encountered on aircraft. Moreover the rotary shaft may carry a large number of cams, each of which may be individually coarsely adjusted without disturbing the settings of the remaining cams, and the switch for each cam may be adjusted individually to a micrometric degree independently of the other switches of the set.

While I have shown a particular embodiment of my invention, it will be understood, of course, that I do not wish to be limited thereto, since many modifications may be made, and I therefore contemplate by the appended claims to cover any such modifications as fall within the true spirit and scope of my invention.

Having thus described my invention, what I claim and desire to secure by Letters Patent is:

1. A switch mechanism comprising a frame, a spindle supported for rotation in said frame, means for rotating said spindle, a plurality of cams commonly carried on said spindle, means for coarse adjustment of the angular relation of each of said cams independently with reference to said spindle, a plurality of electrical switches independently supported on said frame one individual to each cam and each having an actuating element for operation by its said cam, means for fine adjustment of the position of an element to alter the operating point of an individual switch in its relation to the angular position of its cam, and resilient means operatively associated with said cams for continuously maintaining a selected coarse adjustment thereof.

2. A switch in accordance with claim 1 in which said switch-supporting means is a pivot and said switch adjusting means includes a member for tilting said switch on said pivot.

3. A switch mechanism comprising a frame, a spindle rotatably supported in said frame, means for rotating said spindle, a plurality of cams carried on said spindle for angular adjustment and axial movement with respect thereto, a plurality of annular members carried on said spindle for axial movement with respect thereto, means common to said members and spindle to key the same for mutual rotation, said cams and members having abutting interlocking faces for rotation of said cams by said members, and resiliently retained, continuously active, axially movable means for normally maintaining said faces in keyed engagement and releasable manual overriding of the bias of said maintaining means for unlocking said members and cams, and an electrical switch individual to each cam and actuatable thereby.

4. A switch mechanism in accordance with claim 3 in which said maintaining means comprises a coiled compression spring surrounding said spindle.

5. A switch mechanism in accordance with claim 3 in which said common means comprises a splined connection between said members and spindle.

6. Means for adjustably supporting an electrical switch of the type including a relatively thin-walled casing enclosing the switch elements, said casing consisting of material incapable of receiving screw-threaded fastening means without the hazard of fracture and said casing having at least one bore therein comprising a frame, a pivot affixed to said frame for receiving said bore and whereby said switch may be tilted upon said pivot, a lever also tiltably carried on said pivot and having a portion disposed adjacent one face of the casing and another portion disposed adjacent a face of the casing adjoining said first face for movement of said casing and lever jointly in at least one rotational sense, tension means for biasing said lever in said sense, and screw means cooperative with said casing for overcoming said tension means to move said casing in the opposite sense.

7. Means for adjustably supporting an electrical switch of the type including a relatively thin-walled casing enclosing the switch elements, said casing consisting of material incapable of receiving screw-threaded fastening means without the hazard of fracture and said casing having an actuating button for abutment by an operating member and a bore through said casing at right angles to the axis of movement of said button comprising a frame, a shaft secured in said frame and receiving said bore for tilting movement of said casing on said shaft, a lever pivotally supported on said shaft and having a projection abutting a face of said switch which is parallel to the axis of tilt, resilient means connected intermediate said lever and frame for biasing said lever and casing in one rotational sense, and means engaging said casing for moving said casing and lever in the opposite sense against the bias of said resilient means whereby movement of said casing in one sense or the other is effective to alter the relation between said operating member and button.

8. Switch mechanism comprising a splined shaft mounted for rotation, a plurality of cams received on said shaft, each cam having a circular aperture sufficiently greater in diameter than the maximum diameter of said shaft to enable relative rotation between said cams and shaft, a plurality of disc-like elements each having a splined aperture for engagement over said shaft for rotation therewith, said cams and elements being alternately stacked on said shaft, the juxtaposed faces of the same having interengaged radially-disposed serrations, continuously active resilient means on said shaft for maintaining said interengaged relation, a switch individual to each cam, each said switch having an operating member for actuation by its cam, and means for mounting each switch for pivotal adjustment to move the operating member thereof substantially radially with respect to the axis of said shaft.

References Cited in the file of this patent

UNITED STATES PATENTS

| | | |
|---|---|---|
| 2,169,039 | Defandorf et al. | Aug. 8, 1939 |
| 2,300,897 | Hopkins | Nov. 3, 1942 |
| 2,319,503 | Glogau | May 18, 1943 |
| 2,468,974 | Hammer | May 3, 1949 |